United States Patent [19]

Mayn

[11] Patent Number: 5,388,735
[45] Date of Patent: Feb. 14, 1995

[54] DETACHABLE BASKET AND SUPPORT FOR A VELOCIPEDE

[76] Inventor: Charles R. Mayn, 2701 N. Ocean, #307, Boca Raton, Fla. 33431

[21] Appl. No.: 85,105

[22] Filed: Jul. 2, 1993

[51] Int. Cl.$^6$ ............................................. B62J 9/00
[52] U.S. Cl. .............................. 224/32 R; 224/30 R; 224/39
[58] Field of Search ............... 224/30 R, 30 A, 32 R, 224/32 A, 36, 39, 41, 42, 42.03 A; 248/221, 3, 316, 7

[56] References Cited

U.S. PATENT DOCUMENTS

| | | | |
|---|---|---|---|
| 551,068 | 12/1895 | Wilson | 224/41 X |
| 2,143,065 | 1/1939 | Glenny | 224/36 |
| 2,518,537 | 8/1950 | Frenchik | 224/32 R |
| 4,083,392 | 4/1978 | Kobayashi | 224/30 R X |
| 4,730,758 | 3/1988 | McMurtrey | 224/36 |

FOREIGN PATENT DOCUMENTS

| | | | |
|---|---|---|---|
| 0989044 | 9/1951 | France | 224/32 A |
| 3307664 | 9/1984 | Germany | 224/30 A |
| 0140627 | 4/1920 | United Kingdom | 224/36 |
| 2103165 | 2/1983 | United Kingdom | 224/32 A |

*Primary Examiner*—J. Casimer Jacyna
*Attorney, Agent, or Firm*—Alvin S. Blum

[57] ABSTRACT

A basket is held securely and removably on a velocipede, such as between the wheels of a tricycle, by means of a basket support. A base of the support is affixed atop the velocipede frame. The basket has a pair of apertures in its fore wall and a pair of apertures in its aft wall. Two pairs of hooks extend upward from the base to engage the apertures, to secure the basket when the basket is flat on the support. The aft pair of hooks are fixed and their aperture-engaging portions are arranged to engage their apertures while the basket is tilted up at its forward edge. The fore pair of hooks are arranged to springably snap into their apertures when the basket is lowered so that the bottom of the basket is flat on the support. The basket has a pair of handles pivotally attached to the basket top rim. These handles may be removably engaged by the support to further hold the basket in place. The basket support may include lateral support members which extend upward from the base to engage the sides of the basket and support wheel fenders.

9 Claims, 2 Drawing Sheets

FIG. 1
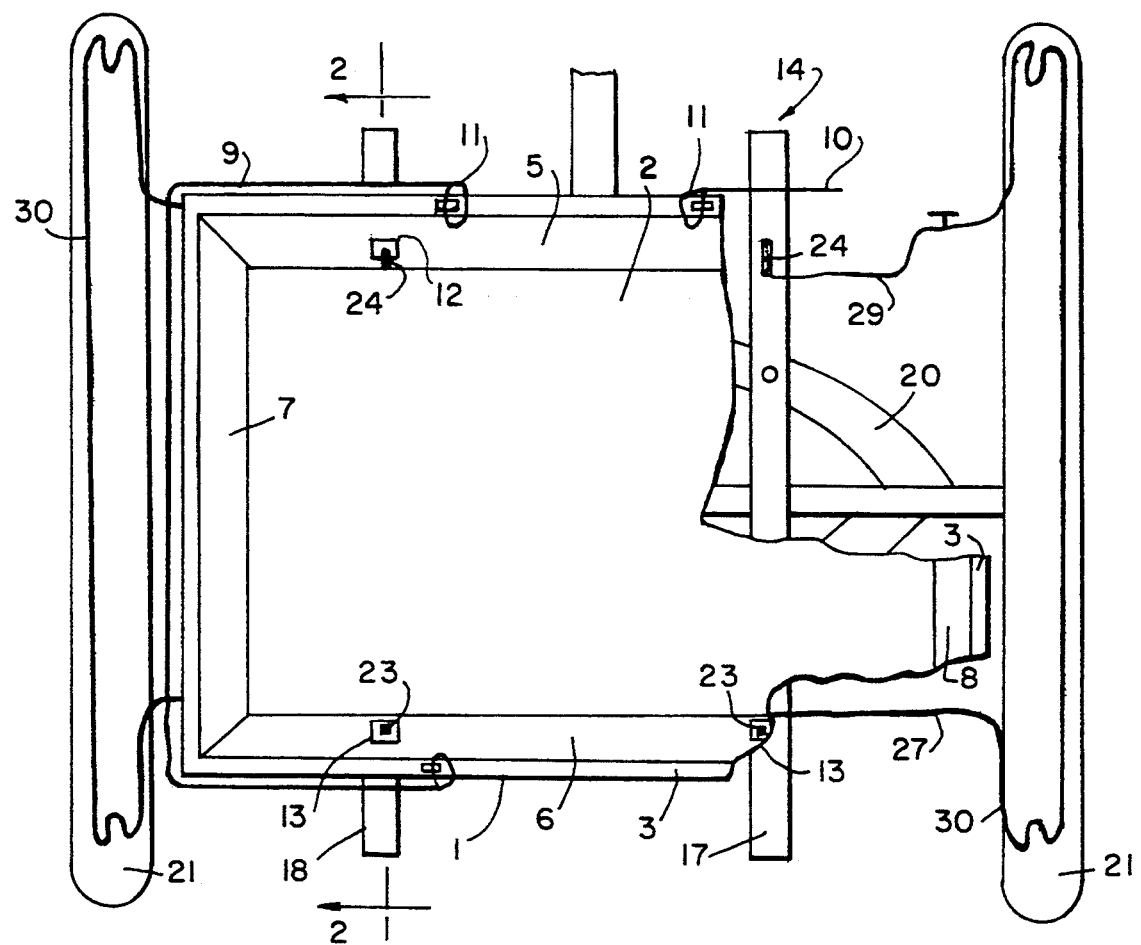
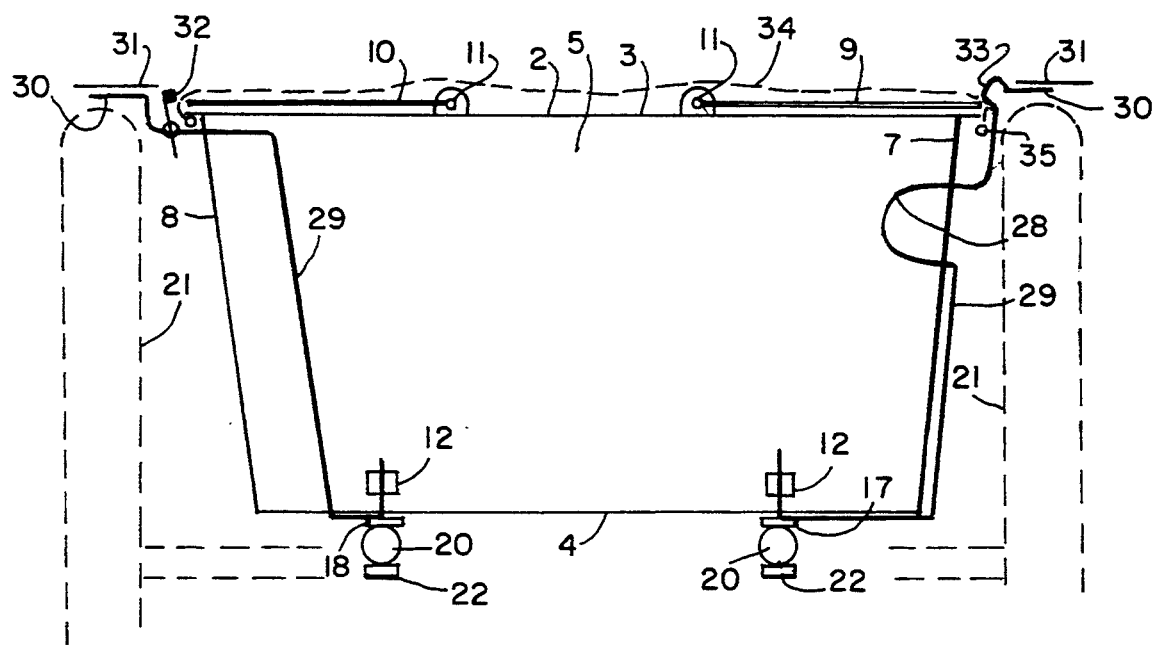
FIG. 4

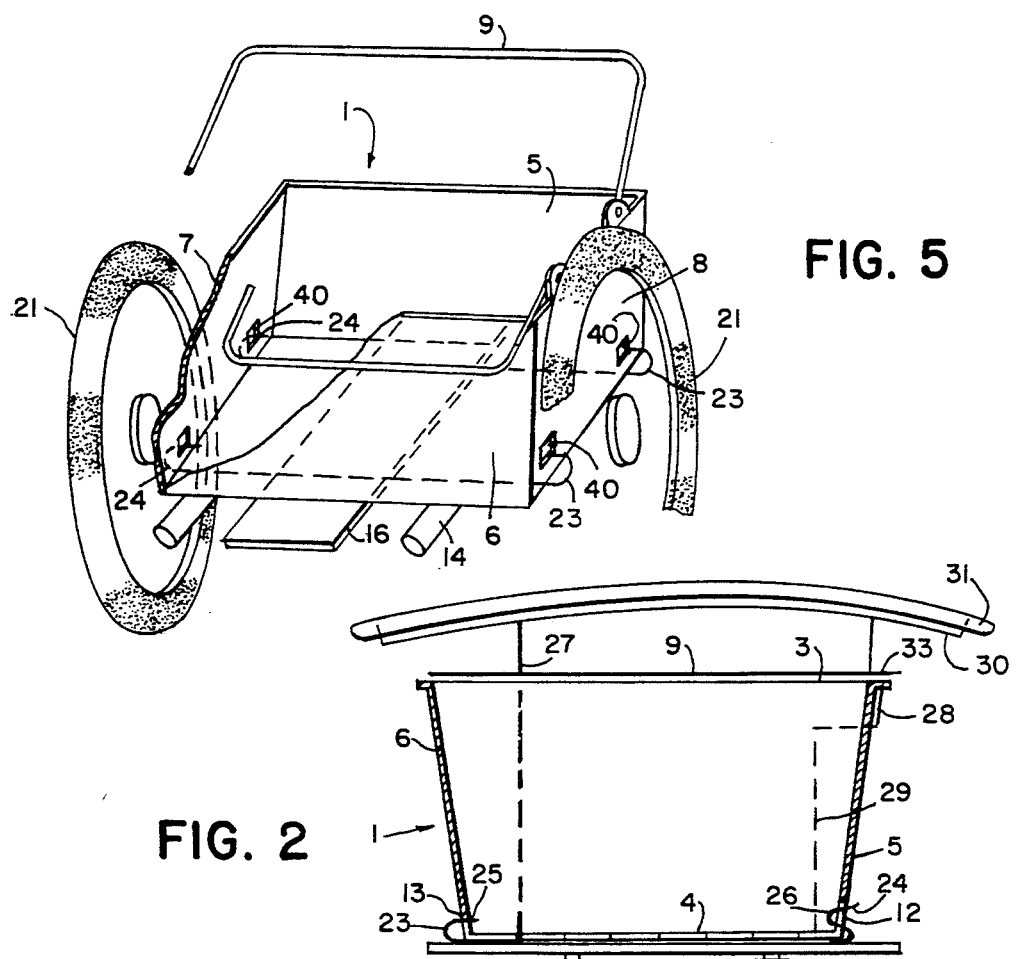
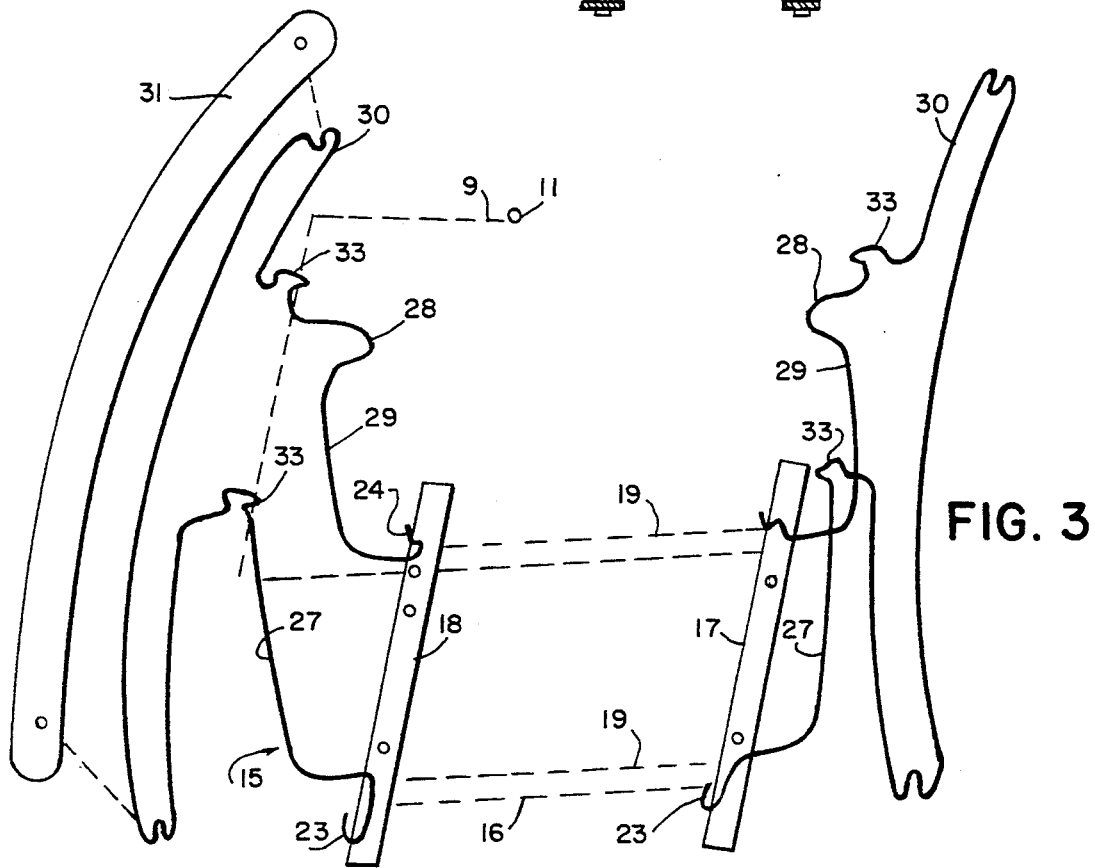

DETACHABLE BASKET AND SUPPORT FOR A VELOCIPEDE

BACKGROUND OF THE INVENTION

This invention relates to baskets for tricycles, bicycles, and the like, and more particularly to a basket assembly including a basket supporting bracket adapted to mount to the frame of the velocipede and a basket which is detachably mounted to the basket supporting bracket by means of quick release locking elements.

U.S. Pat. No. 4,730,750 issued Mar. 15, 1988 to McMurtrey reviews the prior art of bicycle baskets and discloses a bracket which is supported by the handlebars and the steering column of a bicycle. A basket with folding handle is readily mounted to or removed from the bracket by a special locking mechanism which holds the basket by one side by two hooks at the bottom of that side and a single lock element at the top center of that side at the handle pivot connection.

This is useful for light loads, but a heavy load causes excessive steering and balance problems, and requires a sturdy basket construction. A lower center of gravity of the load would be more desirable. A support bracket which holds the bottom of the basket would better support a heavy load on a less sturdy basket.

SUMMARY OF THE INVENTION

It is accordingly an object of the invention to provide a velocipede basket and basket support which provides for support of the bottom of the basket with a convenient quick release locking element. It is another object to provide a basket and support assembly with a lower center of gravity. It is yet another object to provide a basket and support assembly which does not interfere with steering. It is yet another object of the invention to provide an assembly with a basket having a pair of handles for easier carrying of heavy and unbalanced loads. It is yet another object of the invention to provide a reusable, readily attachable basket cover for covering the load in the basket.

These objects are accomplished in a basket assembly of the invention which comprises a basket with two pivotal handles, and a basket supporting bracket adapted to be fixedly mounted by a base portion to upper surfaces of the vehicle frame. The bracket includes a pair of forward hooks and a pair of aft hooks. These hooks extend upward from the base portion and will removably engage the fore and aft walls of the basket. The basket has apertures in its fore and aft walls adapted for receiving the hooks. Either the fore or aft pair of hooks have a generally sigmoid shape to allow for that pair of hooks to springably engage or disengage the basket apertures when that side of the basket is lowered or lifted. The hooks and/or, the basket are provided with sufficient resiliency to allow this action. The basket is installed, on the bracket by tilting it so that the non-sigmoidal hooks engage the apertures on a first side of the basket. Then the basket is lowered to a level position, forcing the sigmoid hooks and/or the basket on that side to spring apart until the hooks can engage the apertures to hold the basket securely in place. The pair of handles may then be lowered to the sides of the basket and snapped over handle retaining elements extending up from the base portion to further secure the basket on the bracket.

These and other objects, features and advantages of the invention will become more apparent when the detailed description is described in conjunction with the drawings.

BRIEF DESCRIPTION OF THE DRAWINGS

FIG. 1 is a top view, partially broken away, of the basket and support of the invention.

FIG. 2 is a side elevation sectional view taken through line 2—2 of FIG. 1.

FIG. 3 is a perspective view of the basket support means of the invention.

FIG. 4 is a front elevation view of the basket assembly of the invention with cover in place.

FIG. 5 is a diagrammatic perspective view, partially broken away, of another embodiment of the invention.

DETAILED DESCRIPTION OF THE PREFERRED EMBODIMENT

Referring now to the drawings, a basket 1 having an open top 2, a top rim 3, a bottom 4, a fore wall 5, an aft wall 6, a left wall 7 and a right wall 8, has a pair of wire handles 9, 10, pivotally attached to the top rim by pivots 11. The basket may be of conventional basket construction well known in the art, such as metal or plastic construction, perforated metal or plastic construction or woven metal, plastic or natural fiber construction.

A pair of apertures 12 are provided in the lower portion of the fore wall and a pair of apertures 13 are provided in the lower portion of the aft wall. The basket 1 is held in place on a velocipide such as the tricycle 14 by a basket support means 15 comprising a base portion 16 which may be separated into two halves 17 and 18 or which may be provided joined together by cross members 19. The base portion is adapted for fixedly mounting upon the upper portion of the tricycle frame 20 between the wheels 21 with bolts 22. A pair of aft hooks 23 and a pair of fore hooks 24 are fixed to the base 16 and extend upward therefrom with aperture engaging portions 25 and 26 respectively facing the basket for engaging the apertures 13 and 12 respectively. Hooks 23 are fixed and rigid. They are adapted for engaging the apertures 13 when the bottom of the aft wall of the basket is resting upon the base 16 and the bottom of the fore wall of the basket is tilted up. After aft hooks 23 are engaged, the fore wall of the basket is lowered onto the base 16. The fore hooks 24 are arranged for a springy latching action, so that the aperture engaging portion 26 will spring forward when the bottom edge of the fore wall 5 passes them. They spring back aft into the apertures when the bottom of the basket is laid flat against the base 16 to look the basket securely in place. Tilting up the fore wall releases the fore hooks, and then the tilted basket is moved forward to disengage the aft hooks 23 when the basket is to be removed.

Four lateral members 27, 29 extend upward from the base for lateral positioning of the basket to ensure registry of the hooks and apertures and for lateral support of the basket in the form of sturdy bent steel rods. The forward rods 29 may be bent around so that a portion 28 engages the upper portion of the fore wall. This provides a forward arresting element to prevent the basket from tilting forward when the vehicle is stopped suddenly.

The lateral members are extended over the wheels to provide a fender frame 30 on which is mounted a fender 31 which prevents water, dirt and mud from flying up at the operator.

By appropriately bending the lateral members a handle latching means 33 may be formed for springably holding the handles 9 and 10 in the down position. Alternatively, a pivoted, spring-loaded latch 32 of the type well known in the art as shown in FIG. 4, may be used. To protect the basket contents, a waterproof cover 34, provided with an elastic edge 35 for fitting over the top rim 3, may be optionally provided.

Referring now to FIG. 5, another embodiment of the invention is shown in which apertures 40 are formed in the left and right side walls of the basket 1 with corresponding hooks 24 and 23 extending up from the base 16 for engaging those apertures. Fixed hooks 23 are engaged first in the right side wall 8 with the left side tilted up and then the left side is pushed down. Springy hooks 24 then spring into apertures 40 in left side wall 7.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A basket assembly for velocipedes comprising:
    a basket having an open top with an upper rim, a bottom, and fore, aft and left and right walls and a pair of handles pivotally attached to said upper rim, said fore and aft walls each being provided with a pair of spaced-apart apertures at a lower portion thereof;
    basket support means including a base portion adapted for fixedly mounting atop a portion of a velocipede frame;
    two pairs of hooks affixed to said base portion and extending upward therefrom, a first pair of hooks arranged with each hook having an aperture-engaging portion extending rearward for engaging the apertures in the fore wall of the basket when said bottom rests upon said base portion, and a second, pair of hooks arranged with each hook having an aperture-engaging portion extending forward for engaging the apertures in the aft wall of the basket when said bottom rests upon said base portion, one of said pairs of hooks being fixed for engaging the apertures when said bottom is tilted as well as when said bottom is flat upon said base portion and the other of said pairs of hooks being arranged for engaging the apertures only when the bottom of the basket is flat upon the base portion for securely holding the basket and for disengaging the apertures when the basket bottom is tilted up on the corresponding side by a springy latching action, whereby said basket is readily removed from said support means by first tilting up one side of the basket to unlatch said other pair of hooks and then sliding the basket away from said one pair of hooks to completely disengage the basket from the support means.

2. The basket assembly according to claim 1, in which said other pair of hooks are positioned for engaging apertures in said fore wall of the basket.

3. The basket assembly according to claim 2, further comprising at least one forward arresting element connected to said base portion, said arresting element arranged to engage said fore wall above said hooks during a sudden stop to prevent said basket from moving from a supported position on said support means.

4. The basket assembly according to claim 3, further comprising: first handle-latching means attached to said at least one left lateral member, said first handle-latching means arranged to springably and releasably engage one of said pair of handles; and second handle-latching means attached to said at least one right lateral member, said second latching means springably and releasably engaging the other of said pair of handles.

5. The basket assembly according to claim 4, further comprising a cover of a water-tight sheet material having an elastic edge arranged to cover the open top of said basket, said elastic edge engaging said basket below said rim.

6. The basket assembly according to claim 1, in which said support means further comprises at least two lateral support members, at least one left member and at least one right member extending upward from said base portion and defining lateral positioning of said basket for registry of said hooks and said apertures, said members arranged to extend upward adjacent said side walls of said basket to provide lateral support therefor.

7. The basket assembly according to claim 6, further comprising a pair of fenders for covering the upper portion of a pair of side-by-side wheels on said velocipede, a first fender connected to said at least one left member and a second fender connected to said at least one right member.

8. The basket assembly according to claim 7, further comprising at least one forward arresting element connected to said base portion, said arresting element arranged to engage said fore wall of said basket above said hooks during a sudden stop to prevent said basket from moving from a supported position on said support means.

9. A basket assembly for velocipedes comprising:
    a basket having an open top with an upper rim, a bottom, and fore, aft and left and right walls and a pair of handles pivotally attached to said upper rim, said left and right walls each being provided with a pair of spaced-apart apertures at a lower portion thereof;
    basket support means including a base portion adapted for fixedly mounting atop a portion of a velocipede frame;
    two pairs of hooks affixed to said base portion and extending upward therefrom, a first pair of hooks arranged with each hook having an aperture-engaging portion for engaging the apertures in the left wall of the basket when said bottom rests upon said base portion, and a second pair of hooks arranged with each hook having an aperture-engaging portion for engaging the apertures in the right wall of the basket when said bottom rests upon said base portion, one of said pairs of hooks being fixed for engaging the apertures when said bottom is tilted as well as when said bottom is flat upon said base portion and the other of said pairs of hooks being arranged for engaging the apertures only when the bottom of the basket is flat upon the base portion for securely holding the basket and for disengaging the apertures when the basket bottom is tilted up on the corresponding side by a springy latching action, whereby said basket is readily removed from said support means by first tilting up one side of the basket to unlatch said other pair of hooks and then sliding the basket away from said one pair of hooks to completely disengage the basket from the support means.

* * * * *